United States Patent [19]
Krebs

[11] Patent Number: 5,724,118
[45] Date of Patent: Mar. 3, 1998

[54] CLIP-ON LENS ATTACHMENT WHICH CAN BE CUSTOMIZED TO FIT A WIDE VARIETY OF SPECTACLES

[76] Inventor: Martin Krebs, Steinbruchstrasse 26, A-9523 Landskron, Austria

[21] Appl. No.: 666,318

[22] PCT Filed: Dec. 28, 1994

[86] PCT No.: PCT/AT94/00205

§ 371 Date: Jul. 18, 1996

§ 102(e) Date: Jul. 18, 1996

[87] PCT Pub. No.: WO95/18987

PCT Pub. Date: Jul. 13, 1995

[30] Foreign Application Priority Data

Jan. 3, 1994 [AT] Austria ......................... A 5/94
Apr. 27, 1994 [AT] Austria ......................... A 880/94

[51] Int. Cl.⁶ ......................................... G02C 7/08
[52] U.S. Cl. ................................ 351/57; 351/47
[58] Field of Search .................. 351/41, 47, 48, 351/57, 58

[56] References Cited

U.S. PATENT DOCUMENTS

| | | | |
|---|---|---|---|
| 1,620,569 | 3/1927 | Quick | 351/47 |
| 1,909,796 | 5/1933 | Anderson | 351/47 |
| 1,971,055 | 8/1934 | Shindel | 351/47 |
| 2,065,458 | 12/1936 | Hines | 357/47 |
| 2,538,692 | 1/1951 | Lindblom | 351/47 |
| 2,678,584 | 5/1954 | Eyles | 351/47 |

FOREIGN PATENT DOCUMENTS

| | | |
|---|---|---|
| 301 212 | 8/1972 | Austria . |
| 374 010 | 3/1984 | Austria . |
| 987 858 | 8/1951 | France . |
| 1 036 891 | 9/1953 | France . |
| 1 095 500 | 6/1955 | France . |
| 1 566 709 | 5/1969 | France . |
| 416 303 | 9/1934 | United Kingdom . |
| 690 493 | 4/1953 | United Kingdom . |
| 729 482 | 5/1955 | United Kingdom . |

*Primary Examiner*—Huy Mai
*Attorney, Agent, or Firm*—Young & Thompson

[57] ABSTRACT

A clip lens attachment consists of a bow which connects to rings. The rings are made of a flexible material which can be shrunk in order to adjust its size. The lenses thus attached may be of almost any shape, as the rings can be shrunk to fit the attachment lenses. A hook is attached at each end of the bow for clipping the upper portion of the clip on lens attachment to the frames. Additional hooks are provided on the rings to provide attachment points at the bottom or sides. The ends of the bow and the lower hooks are embedded in the material which forms the rings. With such a device, separate styles of clip on attachments need not be designed for each style spectacles.

25 Claims, 4 Drawing Sheets

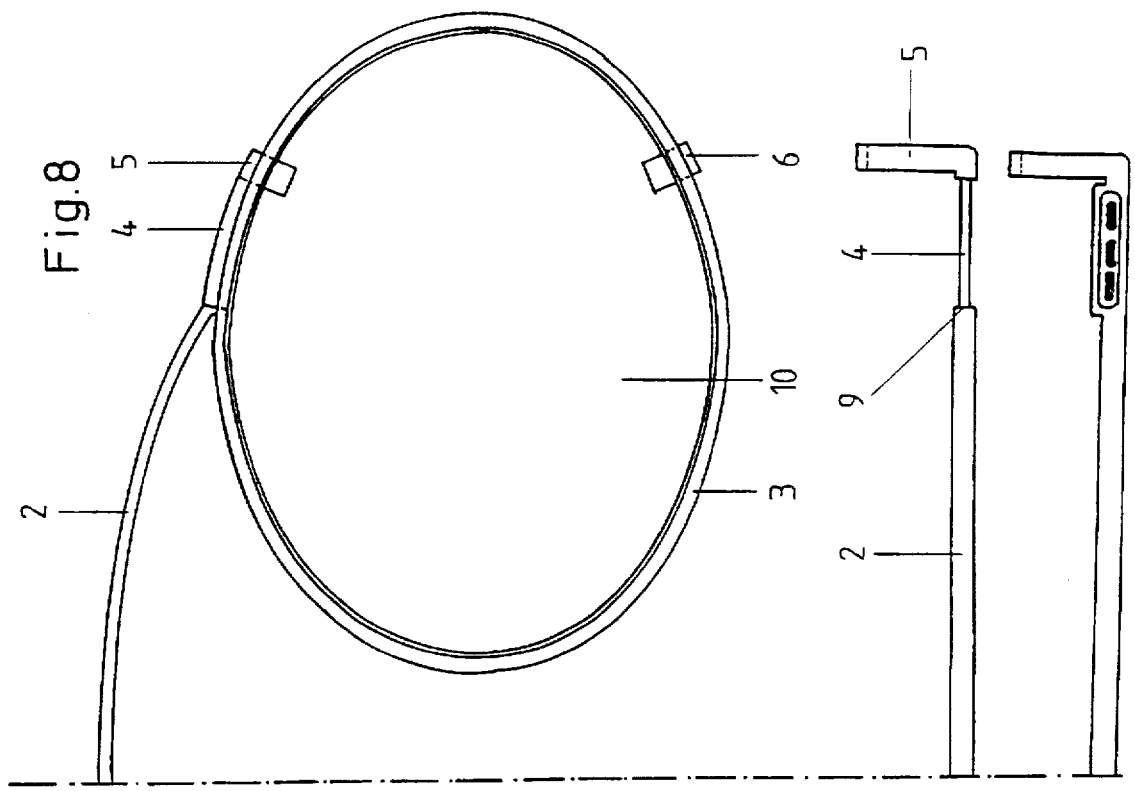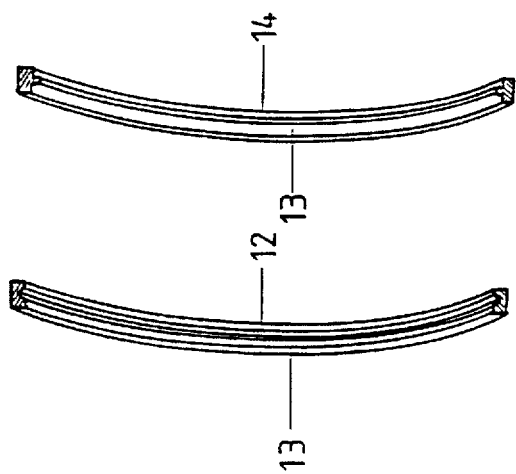

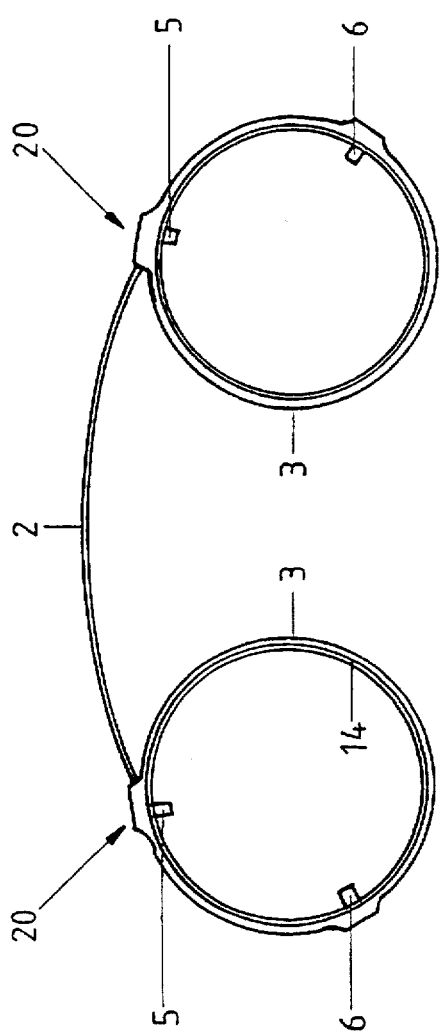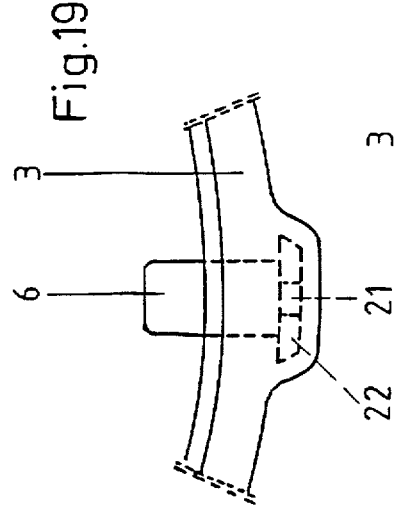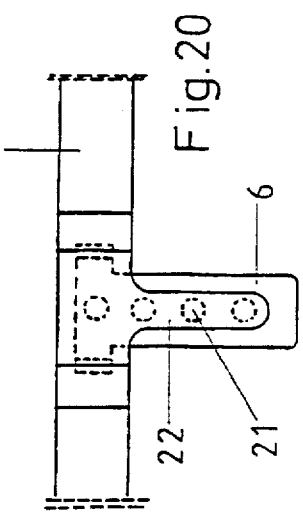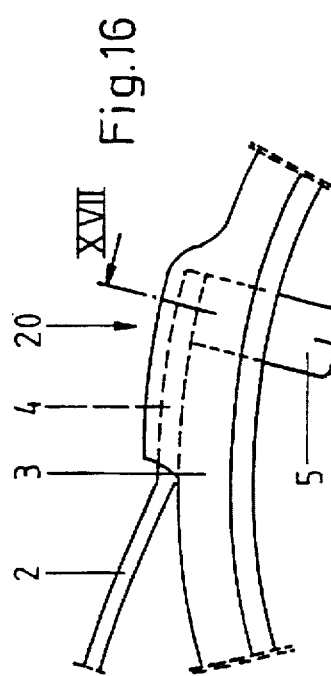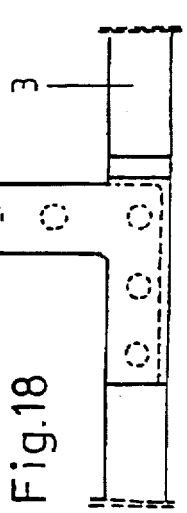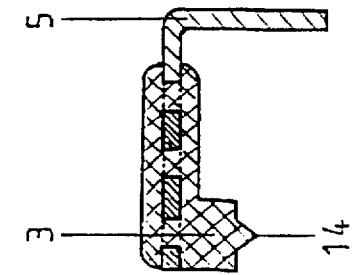

CLIP-ON LENS ATTACHMENT WHICH CAN BE CUSTOMIZED TO FIT A WIDE VARIETY OF SPECTACLES

BACKGROUND OF THE INVENTION

1. Field of the Invention

The invention relates to a device for attaching supplementary lenses to spectacles with two flexible, closed rings which hold the supplementary lenses, a bow which joins the rings, and with hooks for fixing the device to the spectacles.

These device which are also called clip-on lens attachments are known in various versions.

2. Description of the Prior Art

Thus for example metal clip-on lens attachments are known. These clip-on lens attachments however have the disadvantage that they are suited only for spectacles of a quite specific shape, since they can only hold supplementary lenses which have a certain outline and since attachment of the clip-on lens attachment in spectacles shaped differently from the spectacles for which it is intended is not possible with the required safety.

Clip-on lens attachments are also known which have two plastic disks which are interconnected via a metal clasp which can be clipped to the frame of the spectacles. Since the disks are made of plastic, it is possible to cut or grind them according to the outline of the spectacles to which the clip-on lens attachments are to be clipped.

One disadvantage of the latter known embodiment of clip-on lens attachments is that cutting to size is usually done by hand and not with the required accuracy, so that an unattractive appearance results, and that the clip-on lens attachment is fixed only on the upper edge of the frame of the spectacles so that holding is not reliable.

FR-A-1 036 891, U.S. Pat. No. 1,909,796, FR-A-987 858 or FR-A-1 095 500 disclose clip-on lens attachments and spectacles with rings which are closed in themselves and which consist of flexible material so that they can be adapted to different shapes of spectacle lenses.

SUMMARY OF THE INVENTION

The object of the invention is to further develop a device of the initially mentioned type such that with a single embodiment supplementary lenses with outlines which correspond to current spectacle shapes can be attached to spectacles.

According to the invention this is achieved by the rings being of variable length for the supplementary lenses for purposes of shortening their peripheral length.

Because in the invention flexible, and at least for purposes of shortening their periphery, rings of variable length are used, the rings can be not only accurately matched to the shape of the supplementary lenses, but they can also surround them reliably so that the supplementary lenses are easily securely held regardless of their outline.

Due to the invention, devices with one ring size or at most two ring sizes for most spectacles on the market will be available.

In the invention the rings consist for example at least partially of a material which is preferably rubber elastic, which is elastic in length and/or which shrinks under the action of heat so that the supplementary lens can be attached by the rings abutting the supplementary lens by shrinking and/or elastically, and in doing so by their assuming a shape which corresponds to the outline of the supplementary lenses.

In the invention, as mentioned previously, the rings need not consist entirely of a material which shrinks lengthwise and/or which is elastic in length, but it is enough that at least one part of the material of the ring shrinks under the action of heat and/or is elastic. It is enough if the remaining part of the material which comprises the ring is flexible so that it can adapt itself to the outline of the supplementary lenses which are cut to the shape of the lenses of the spectacles.

The invention is not limited to a certain type of supplementary lenses. All supplementary lenses which are used for clip-on lens attachments, regardless of whether of glass or synthetic glass, whether tinted or polarizing, or which color under the action of light, can be attached using the device according to the invention.

In one practical embodiment of the invention it is provided that the rings are attached to the ends of the bow. In this version it is preferred if the areas of the bow via which it is joined to the rings are flexible. In this way the area of the spring elastic bow which is generally metal and via which this area is joined to the rings can be easily matched to the outline of the supplementary lenses, so that a harmonic appearance also results there and the ring entirely adjoins the edge of the supplementary lenses also in the areas in which the bow is attached to the rings.

In one preferred embodiment of the invention it is provided that on the ends of the bow hooks project for fixing the device to the spectacles. These hooks for attachment to spectacles can also be attached to the rings themselves, directly near the ends of the bow. To improve holding of the device of the invention to the spectacles, it can be provided that on each of the rings there is at least one additional bow at a distance from the sites at which the bow is joined to the rings. These additional hooks engage the spectacles laterally and/or from underneath.

It is preferable within the framework of the invention if the areas of the bow via which the bow is joined to the rings are flexible due to notches. In this way especially a metal bow can be matched very easily to the outline of the supplementary lenses.

There are several possibilities for securely fixing the supplementary lenses in the rings. In addition to one simple possibility of cementing the rings to the edges of the supplementary lenses, it is preferred within the framework of the invention if each ring on its side which is facing the supplementary lens which is to be fixed in it has a groove which runs peripherally. Here it can be provided that the groove has an essentially V-shaped cross sectional form.

In one alternative embodiment it can be provided that each ring, on its side which is facing the supplementary lens which is to be fixed in it, has a rib which runs peripherally. Here it is preferred that the ribs are in the center of the inner surface of the rings.

Depending on the version of the frame of the spectacles on which the device of the invention is to be attached, different embodiments of the hooks have proven successful on or in the area of the ends of the (metal) bow and on the rings themselves. One embodiment within the framework of the invention is characterized in that at least some of the hooks are simply bent hooks. Another possibility consists in that at least some of the hooks are made offset, the offset being provided in the area of the hook end attached to the ring. In the two embodiments the hooks can also be made differently, so that on one device there can be offset and simple hooks.

The ends of the bow and/or the hooks can be joined to the rings within the framework of the invention by welding or by cementing.

Within the framework of the invention however it is also possible and preferred that the ends of the bow be joined to the rings by injection molding around the ends of the bow with the material of the rings. In this embodiment reliable joining of the ends of the bow to the two rings of the clip-on lens attachment according to the invention is easily achieved for example immediately in the manufacture of the rings in an injection molding process.

Likewise within the framework of the invention it is considered that individual hooks or all hooks consist of plastic stiffened optionally by a (metal) insert. This plastic need not be the same plastic as the plastic of the rings, but still it is preferred if the hooks are made integral with the rings.

In another embodiment of the invention it can be provided that the hooks provided in the area of the ends of the bow are made integral with the bow for fixing the device to spectacles. This embodiment offers the advantage that separate attachment of the hooks which are located in the area of the ends of the bow and via which the clip-on lens attachment can be attached to spectacles is not necessary.

In another embodiment of the invention it is provided that at least one additional hook at a time for fixing the device to spectacles is fixed on the rings by injection molding around the hook parts with the material which forms the rings. This embodiment allows attachment of these hooks immediately in the manufacture of the rings which takes place for example in an injection molding process.

But it is also possible to make the additional hooks integral with the material of the rings; this likewise offers the advantage of simplified manufacture. Not only in this embodiment, but also in others is it possible that the additional hooks are stiffened by inserts of a material, such as plastic or metal, which is stiffer than the material of the rings.

To ensure reliable connection of the ends of the bow, the hooks and/or the additional hooks of the device according to the invention, if they are embedded in the plastic of the rings, within the framework of the invention it can be provided that at least in the parts embedded in the plastic of the rings on the ends of the bow and/or hooks and/or additional hooks breaches can be provided with holes or the like. When these breaches are provided in the area of the bow ends embedded in the rings, the bow can be easily deformed so that the rings can be matched easily to the outline of the supplementary lenses inserted into the rings in this area as well.

Finally, in the invention it is still possible for the additional hooks to be made of plastic.

The bow which joins the rings can also consist of plastic in the device according to the invention.

BRIEF DESCRIPTION OF THE DRAWINGS

Other details and features of the invention follow from the following description of embodiments of the invention to which reference is made to the drawings.

FIG. 8 shows on an enlarged scale the right half of the clip-on lens attachment shown in FIG. 5.

FIG. 9 shows in an overhead view one half of the bow from FIG. 6 with one hook in two embodiments.

FIG. 10 shows in a section along line X—X from FIG. 8 a ring (without the bow).

FIG. 11 shows one alternative embodiment in a section analogous to FIG. 10.

FIG. 12 shows another embodiment of a clip-on lens attachment.

FIG. 16 shows on an enlarged scale the location at which the ends of the bow are joined to one of the rings of the clip-on lens attachment.

FIG. 17 shows a section along line XVII—XVII in FIG. 16.

FIG. 18 shows an overhead view to FIG. 16.

FIG. 19 shows on an enlarged scale one embodiment for attachment of a hook.

FIG. 20 shows an overhead view to FIG. 19, and

DESCRIPTION OF THE PREFERRED EMBODIMENT

Figure 1:
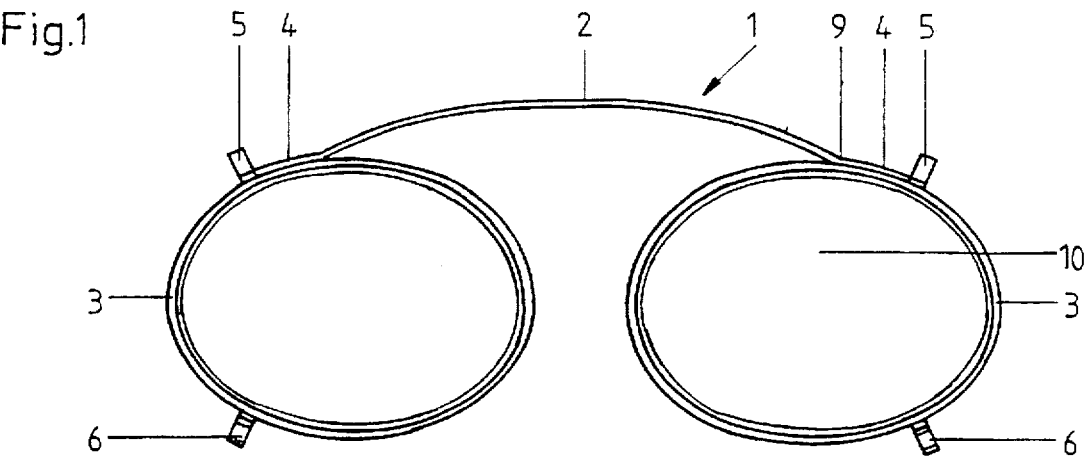
FIG. 1 shows in a front view the first embodiment of a clip-on lens attachments.
Figure 2:
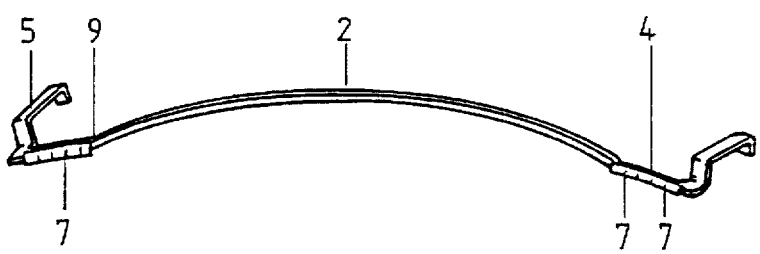
FIG. 2 shows the bow of the clip-on lens attachment in an oblique view.

Clip-on lens attachment 1 in the embodiment shown in FIGS. 1 and 2 consists of bow 2 and two rings 3. Bow 2 is joined in the area of its ends 4 to rings 3 by cementing or welding. On the ends of bow 2 there is one hook 5 each with which clip-on lens attachment 1 can be attached to the spectacles. Hooks 5 engage the spectacles from overhead. Hooks 5 can also be attached to rings 3.

In an area at a distance from the area in which rings 3 are joined to ends 4 of bow 2, on rings 3 there are additional hooks 6 which engage the spectacles from underneath or laterally so that clip-on lens attachment 1 can be securely attached to the spectacles.

Bow 2 can be made of metal, plastic or a natural material. However, it should have the elasticity necessary for secure attachment of the clip-on lens attachment of the invention to spectacles (clip on).

Ends 4 of bow 2 can be made flexible, especially when it consists of metal, by means of several notches 7, so that they can assume a curvature which corresponds to the outline of supplementary lenses 10 which are attached in rings 3 by plastic deformation.

Hooks 5 and 6 can like bow 2 be joined to rings 3 by cementing or welding.

Rings 3 are made of flexible material, for example, plastic, and can therefore be matched to the outline of supplementary lenses 10 which are ground according to the shape of the lenses of the spectacles on which clip-on lens attachment 1 is to be placed.

In order that rings 3 around supplementary lenses 10 can abut the latter, rings 3 are made at least partially of a material which is of variable length for purposes of shortening. This material can be a rubber-elastic plastic. The integral execution of rings 3 from rubber elastic materials is possible. Rings 3 can preferably also consist entirely or partially of a material which shrinks for example under the action of heat, with shortening of its length. In this embodiment supplementary lenses 10 are positioned within rings 3 and then the shrinking process is triggered so that rings 3 abut the external periphery of supplementary lenses 10 and hold them.

Figure 3:
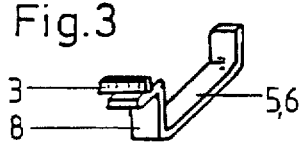
FIG. 3 shows one embodiment of a hook.
Figure 4:
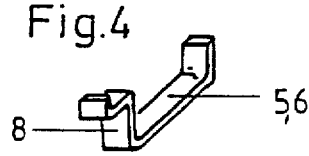
FIG. 4 shows another embodiment of a hook.

Hooks 5 and 6 shown in the embodiment of clip-on lens attachment 1 from FIG. 1 preferably have the embodiment offset in FIG. 3 or 4.

Between bow 2 and its ends 4 there is kink 9 so that the glass plane or the location of supplementary lenses 10 can be accurately adapted to the spectacles.

With hooks 5 and 6 vertical compensation between metal and plastic frames is possible in order to bring rings 3 into agreement with the size of the frame of the spectacles to which clip-on lens attachment 1 is to be attached.

Hooks 5 and 6 are preferably stamped from metal according to the embodiments shown.

Figure 7:
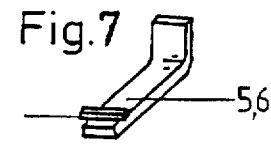
FIG. 7 shows one embodiment of a hook.
Figure 5:
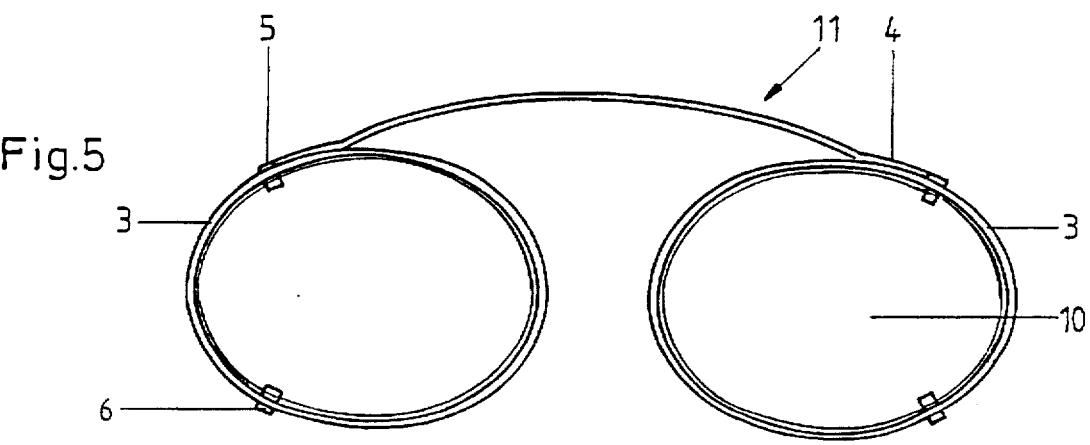
FIG. 5 shows a second embodiment of a clip-on lens attachment.
Figure 6:
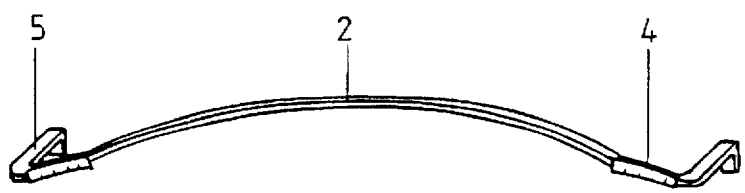
FIG. 6 shows the bow of the clip-on lens attachment from FIG. 5 in an oblique view.

In the embodiment of clip-on lens attachment 11 shown in FIG. 5, hooks 5 and 6 are made as shown in FIG. 7, i.e., simple hooks without the offset of the embodiments of FIGS. 3 and 4. Other details of the embodiment shown in FIGS. 5 and 6 can be taken from FIGS. 8 and 9.

In order to improve the seat of supplementary lenses 10 in rings 3, supplementary lenses 10 can be simply cemented into rings 3. Supplementary lenses 10 can also have a bevel cut on their edge which fits into peripheral groove 12 on inside surface 13 of ring 3, the surface facing supplementary lens 10. Thus a secure seat of supplementary lens 10 of clip-on lens attachment 1 or 11 is ensured even without cementing or at least without continuous cementing (FIG. 10).

One alternative embodiment is shown in FIG. 11. In it, in the center of inner surface 13 of ring 3 which faces supplementary lens 10, there is peripheral rib 14 with a cross section which is rectangular in the embodiment shown (any other cross sectional shape is conceivable). This rib 14 fits into a corresponding groove on the periphery of supplementary lens 10 so that in this embodiment supplementary lens 10 is securely held in ring 3.

Figure 13:
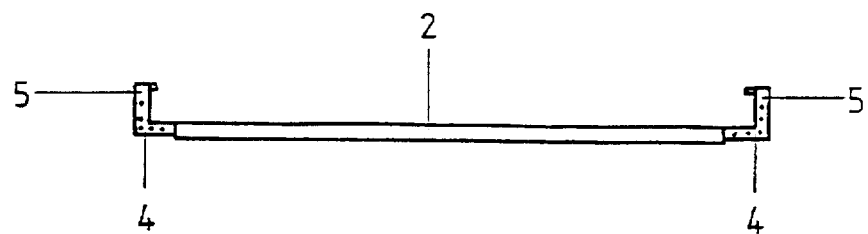
FIG. 13 shows one embodiment of a bow with hooks molded on integrally.
Figure 14:
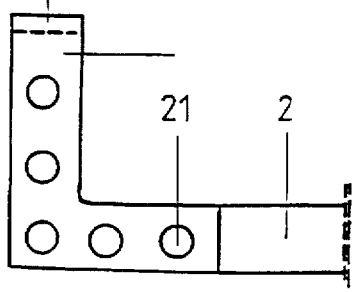
FIG. 14 shows a detail of the bow from FIG. 14 in an overhead view.
Figure 15:
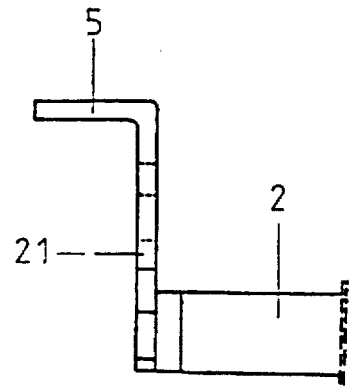
FIG. 15 shows a detail of the bow in the area of a hook in a side view.

In the embodiment of the clip-on lens attachment according to the invention which is shown in FIG. 12 there is bow 2 which, as is shown in FIGS. 13 through 15, is made integral with hooks 5 which are provided in the area of its ends 4. Bow 2 is joined to rings 3 of the clip-on lens attachment by its ends 4 and at least partially hooks 5 formed integrally with it being embedded in the material of rings 3 in the areas labelled 20 shown in FIG. 12. This can take place according to the invention by ends 4 of bow 2 and at least partially hooks 5 being injection molded peripherally with the material of rings 3 in the manufacture of the latter. To achieve a reliable connection between ends 4 of bow 2 and the material of rings 3, there can be holes 21 in the sections embedded in the material of rings 3 (see FIGS. 14 and 15).

Also additional hooks 6 which are attached at a distance from ends 4 of bow 2 to the rings can be at least partially embedded in the material of rings 3; this likewise can be done by injection molding around the hook-shaped parts with the material of rings 3. Thus it is possible to coat hooks 5 and/or 6 entirely with the material of rings 3, or only part of hooks 5 or 6 is coated with the material of rings 3.

In the embodiment shown in FIGS. 19 and 20, in the area of hooks 6 there are stiffening inserts 23 which are provided with holes 21 and which impart to hooks 6 the necessary strength without adversely affecting their elastic deformability.

Figure 21:
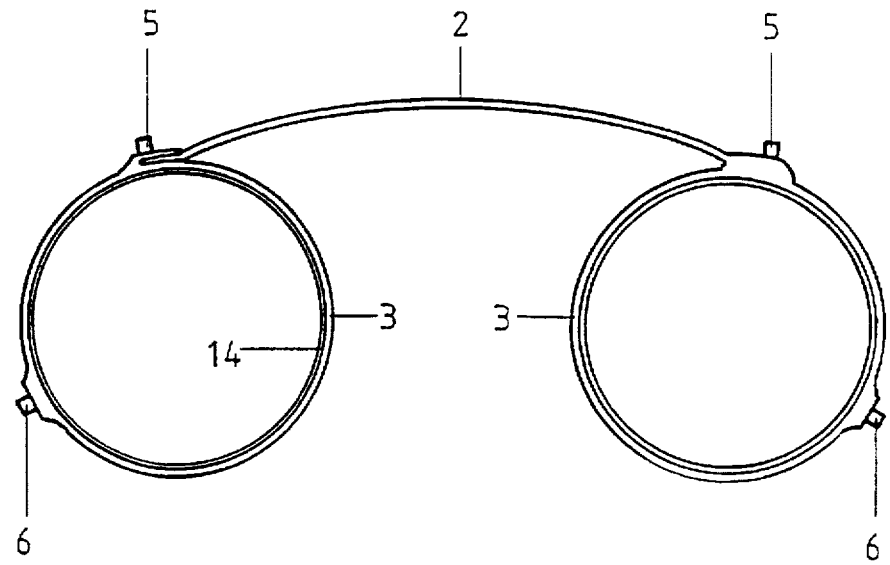
FIG. 21 shows another embodiment of a clip-on lens attachment.

In the embodiment of a clip-on lens attachment according to the invention or a clip-on lens attachment which is shown in FIG. 21, hooks 5 and 6 are made as described using the embodiment shown in FIGS. 1 through 4 so that rings 3 are arranged offset to the inside relative to the frame of the spectacles to which the clip-on lens attachment or clip-on lens attachments is attached.

It should still be pointed out that inserts 22 of hooks 6 can consist of a material which is stiffer and harder than that of rings 3, inserts 22 being made for example of plastic or metal.

Hooks 5 and/or 6 can also be made without stiffening inserts and can be made integral with rings 3. This is especially preferred for additional hooks 6.

It can be recognized that with the invention a variable clip-on lens attachment, for example, of a metal-plastic combination, is made available. The basic idea of the invention consists in that the ring can be matched accurately to the shape and size of the supplementary lenses which have been cut to size. In this way, for any shape and size of a frame, a clip-on lens attachment or clip-on lens attachments with exactly the same size and shape of the lenses of the spectacles on which the clip-on lens attachment can be hung can be made.

In summary, the invention can be described for example and preferably as follows:

Device 1 for attachment of supplementary lenses 10 (clip-on lens attachment) consists of bow 2 which on each of its ends 4 carries ring 3 of flexible material which can be shrunk for purposes of shortening its peripheral length. There are hooks 5 on free ends 4 of bow 2. There are additional hooks 6 on rings 3 of clip-on lens attachment 1. Clip-on lens attachment 1 can be attached to spectacles via hooks 5 and 6. The ends of bow 2 and hooks 6 are embedded in the material which forms rings 3. Since rings 3 consist of a flexible and shortenable material, they easily adapt to any size and outline of supplementary lenses which occur in practice so that supplementary lenses 10 can be accurately adapted to the shape of the spectacles and a special base body for clip-on lens attachment 1 need not be kept in reserve for each spectacle format and each spectacle shape.

I claim:

1. Device (1, 11) for attaching supplementary lenses (10) to spectacles, comprising two flexible, closed rings (3) which hold the supplementary lenses (10), bow (2) which joins the rings (3), and hooks (5, 6) for attaching the device (1, 11) to the spectacles, wherein a perimeter of the rings (3) can be reduced in size.

2. Device according to claim 1, wherein each of the rings (3) comprises a material which shrinks under application of heat to shorten the perimeter of the ring.

3. Device according to claim 1, wherein the rings (3) comprise an elastic material.

4. Device according to claim 1, wherein the rings (3) are attached to respective ends (4) of the bow (2).

5. Device according to claim 4, wherein the ends (4) of the bow (2) are flexible.

6. Device according to claim 5, further comprising notches (7) disposed on the ends (4) of the bow (2), wherein the notches (7) allow flexibility of the ends (4).

7. Device according to claim 4, wherein in a transition area of the bow (2) at the ends (4) there is kink (9).

8. Device according to claim 4, wherein the ends (4) of the bow (2) are joined to the rings (3) by injection molding around the ends (4) of the bow (2) and a portion of the rings (3).

9. Device according to claim 1, further comprising hooks (5) for attaching the device (1, 11) to the spectacles, wherein the hooks (5) project from ends (4) of the bow (2).

10. Device according to claim 9, further comprising at least one additional hook (6) disposed upon each of the rings (3) for attaching the device (1, 11) to the spectacles at a distance from a site at which a respective said ring (3) is joined to the bow (2).

11. Device according to claim 10, wherein at least one of the hooks (5, 6) comprises an offset, said offset (8) being provided in an area of an end of the hook (5, 6), said end of the hook being attached to the ring (3).

12. Device according to claim 10, wherein at least one of the hooks (5, 6) is a simply bent hook.

13. Device according to claim 10, wherein at least one of the ends (4) of the bow (2) and the ends of the hooks (5, 6) are joined to the rings (3) by welding.

14. Device according to claim 10, wherein at least one of the ends (4) of the bow (2) and the ends of the hooks (5, 6) are joined to the rings (3) by cementing.

15. Device according to claim 10, wherein the at least one additional hook (6) is attached to one of the rings (3) by injection molding around a portion of the additional hook (22) and a portion of the rings (3).

16. Device according to claim 10, wherein the additional hooks (6) are made integral with the rings (3).

17. Device according to claim 10, wherein the additional hooks (6) are stiffened by inserts (22) of a material which is stiffer than a material of which the rings (3) are composed.

18. Device according to claim 10, wherein at least one of the hooks (5) and the additional hooks (6) are provided with holes (21).

19. Device according to claim 10, wherein hooks (5) and/or additional hooks (6) consist of a material which is different from a material of which the rings (3) are formed.

20. Device according to claim 9, wherein the hooks (5) are made integral with the bow (2).

21. Device according to claim 1, wherein the bow (2) consists of material which is optionally stiffened by a metal insert.

22. Device according to claim 1, further comprising a groove disposed on an inside surface (13) of each said ring (3) which faces supplementary lens (10).

23. Device according to claim 22, wherein the groove (12) has an essentially V-shaped cross sectional form.

24. Device according to claim 1, further comprising a rib disposed on an inside surface (13) of each said ring (3) which faces supplementary lens (10).

25. Device according to claim 24, wherein the ribs (14) are centered on the inside surfaces (13) of the rings (3).

* * * * *